(12) United States Patent
Wygant et al.

(10) Patent No.: US 10,816,347 B2
(45) Date of Patent: Oct. 27, 2020

(54) TUNNEL MAPPING SYSTEM AND METHODS

(71) Applicant: Maser Consulting, P.A., Red Bank, NJ (US)

(72) Inventors: Clay Alan Wygant, Albuquerque, NM (US); Paul DiGiacobbe, Dunedin, FL (US); Brad Hultquist, Albuquerque, NM (US)

(73) Assignee: Maser Consulting, Inc., Red Bank, NJ (US)

( * ) Notice: Subject to any disclaimer, the term of this patent is extended or adjusted under 35 U.S.C. 154(b) by 153 days.

(21) Appl. No.: 16/217,226

(22) Filed: Dec. 12, 2018

(65) Prior Publication Data

US 2020/0025578 A1  Jan. 23, 2020

Related U.S. Application Data

(60) Provisional application No. 62/597,464, filed on Dec. 12, 2017.

(51) Int. Cl.
  *G01C 21/32* (2006.01)
  *G01S 19/46* (2010.01)
  *G01S 17/89* (2020.01)
  *G01S 17/86* (2020.01)
  *G01S 17/894* (2020.01)
  *G01S 19/47* (2010.01)

(52) U.S. Cl.
  CPC ............. *G01C 21/32* (2013.01); *G01S 17/89* (2013.01); *G01S 19/47* (2013.01)

(58) Field of Classification Search
  CPC ......... G01C 21/32; G01S 19/47; G01S 17/89; G01S 17/86; G01S 17/4817; G01S 17/894
  See application file for complete search history.

(56) References Cited

U.S. PATENT DOCUMENTS

| | | | |
|---|---|---|---|
| 2013/0041583 A1* | 2/2013 | Samokhin | G09B 29/007 701/428 |
| 2014/0125655 A1* | 5/2014 | Kunath | G01C 21/32 345/419 |

(Continued)

*Primary Examiner* — Marthe Y Marc-Coleman
(74) *Attorney, Agent, or Firm* — Lawrence B. Goodwin; Mandelbaum Salsburg P.C.

(57) ABSTRACT

A process for constructing highly accurate three-dimensional mappings of objects along a rail tunnel in which GPS signal information is not available includes providing a vehicle for traversing the tunnel on the rails, locating on the vehicle a LiDAR unit, a mobile GPS unit, an inertial navigation system, and a speed sensor to determine the speed of said vehicle. A stationary GPS, whose geolocation is well-defined, is located near the entrance of the tunnel. Image-identifiable targets having a well-defined geodetic locations are located at preselected locations within the tunnel. The vehicle traverses the tunnel, producing mass point cloud datasets along said tunnel. Precise measurements of 3D rail coordinates are also obtained. The datasets are adjusted based on the mobile GPS unit, the inertial navigation system, the speed sensor, the location of the image-identifiable targets, and the precise measurements of 3D rail coordinates, to thereby produce highly accurate, and substantially geodetically correct, three-dimensional mappings of objects along the tunnel.

6 Claims, 6 Drawing Sheets

(56) References Cited

U.S. PATENT DOCUMENTS

2015/0301533 A1\* 10/2015 Preston ................. B61L 25/026
　　　　　　　　　　　　　　　　　　　　701/50
2017/0234129 A1\* 8/2017 Preston ................. E21D 9/1093
　　　　　　　　　　　　　　　　　　　　701/500

\* cited by examiner

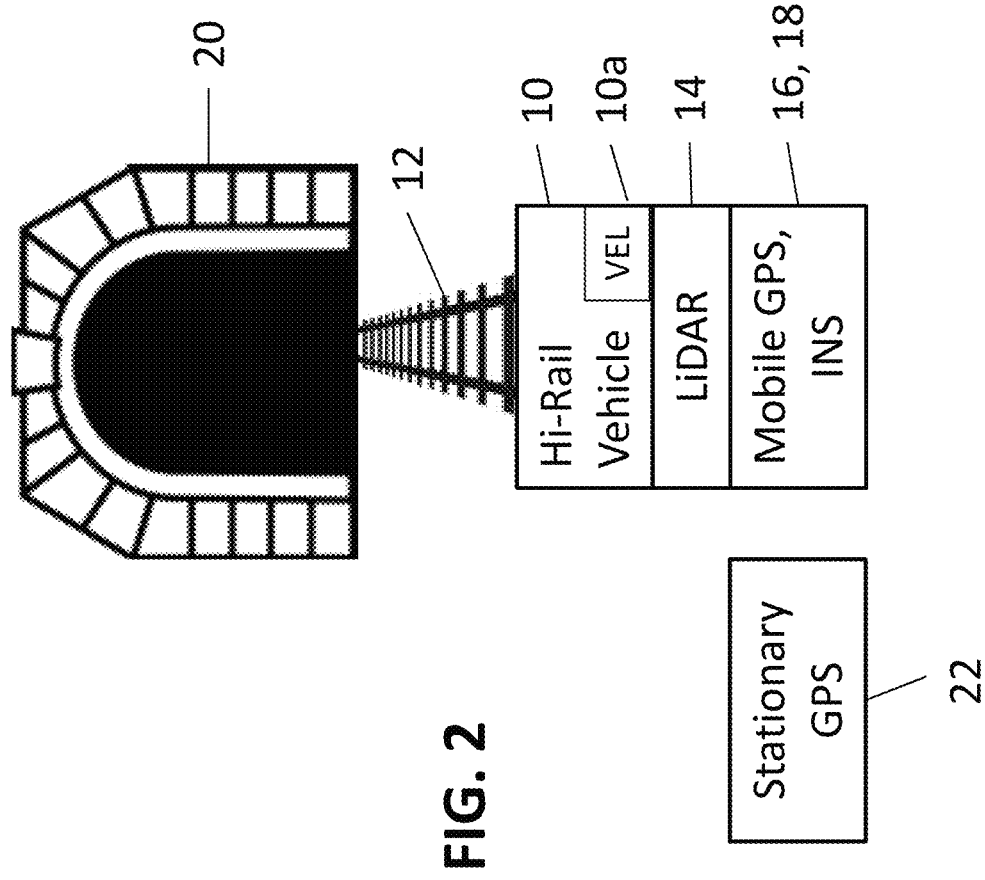

TUNNEL MAPPING SYSTEM AND METHODS

The present application claims priority from U.S. Provisional Application Ser. No. 62/597,464, filed Dec. 12, 2017, the entire disclosure of which is hereby incorporated by reference.

FIELD OF THE INVENTION

The present invention is related to a tunnel mapping system and methods that provide precise mapping of underground transportation tunnels where global positioning system signals may not be available.

BACKGROUND

The precise mapping and characterization of ground transportation paths during construction and maintenance is required to insure operational safety of the public and maintenance personnel. For example, mapping along many miles of railroad track can be used for a variety of purposes, including track alignment, the development of 3D maps, clearance analysis, and future design. The data required for such activities can be acquired using Mobile LiDAR (light detection and ranging), a surveying method that measures distance to a target by illuminating the target with pulsed laser light and measuring the reflected pulses with a sensor to thereby produce mass point cloud datasets characterizing the scanned environment that can be managed, visualized and analyzed.

When mapping rail or subway tracks, a LiDAR unit is typically mounted on a "Hi-Rail" vehicle (a vehicle which can operate both on rail tracks and a conventional road) to travel the path of interest.

It is critically important to geospatially locate such data geodetically in a way that is accurate and spatially representative along the path of interest to meet the specific needs of a project. Thus, in addition to the LiDAR unit, such systems typically include information from a Global Positioning Systems (GPS), and inertial navigation systems (INS). A GPS system provides positional coordinate location anywhere on Earth. An INS system measures roll, pitch, and heading of the LiDAR system. Geolocation can be performed by initially positioning the LiDAR at a GPS base unit at a known geodetic position which can be measured very accurately by an OPUS solution, for example. Then, mobile GPS and INS sensors, co-located with the LiDAR, are run simultaneously along the path of interest, thereby determining the 3D configuration of the path relative to the earth. Combined with the positional information (GPS and INS), the LiDAR measurements are transformed to measurements of actual three-dimensional points of the reflective target in object space. Additional positional accuracy of the scan model may be further enhanced by the use of image identifiable targets that are located along the path of interest at known geospatial locations.

Thus, mobile LiDAR mapping systems have an inherent reliance on GPS for geodetic positioning of the resulting mapping in real-world coordinates. Although such systems work well to define the 3D models relative to the earth, there are problems associated in determining geospatial location in underground paths—such as rail or subway tunnels—where GPS signals cannot be received. Particularly in such environments, however, it is critically important to be able to geodetically define the configurations of infrastructure with particularly accuracy, since clearance information between track and tunnel infrastructure, for example, is required to insure safe operation for passengers and maintenance crews. As an example, engineers may be called upon to define the most accurate and safe position of a newly designed cable tray, with the purpose of extending quality communication lines throughout a subway system. Without geospatially accurate and spatially representative information anywhere within the tunnel corridors, clearances between train or subway cars and cable trays may not be determined with confidence. Accurate information is also critical for projects involving facility design and rehabilitation, critical structural review, additions of new utility hardware, general track maintenance, water seepage, and drainage issues.

SUMMARY OF THE INVENTION

Accordingly, it is an object of the present invention to overcome the difficulties associated with the collection of highly accurate three-dimensional points of the reflective target in object space where GPS signal information is not available or reliable.

In accordance with an exemplary embodiment of the invention, a process is provided for constructing highly accurate three-dimensional representations of objects along a rail tunnel in which GPS signal information is not available. The process includes providing a vehicle for traversing the tunnel on the rails, locating on the vehicle a LiDAR unit, a mobile GPS unit, an inertial navigation system, and a speed sensor to determine the speed of the vehicle. A stationary GPS, whose geolocation is well-defined, is located near the entrance of the tunnel. Image-identifiable targets having a well-defined geodetic locations are located at preselected locations within the tunnel. The mobile GPS unit is adjusted based on the geolocation of said stationary GPS. The vehicle then traverses the tunnel, the LiDAR thereby producing mass point cloud datasets along said tunnel. Precise measurements of 3D rail coordinates are obtained, including at least one of superelevation and track center. The point cloud datasets are adjusted based on the mobile GPS unit, the inertial navigation system, the speed sensor, the location of the image-identifiable targets, and the precise measurements of 3D rail coordinates, to thereby produce highly accurate, and substantially geodetically correct, three-dimensional mappings of objects along the tunnel.

The process may also include obtaining pre-defined tunnel geometry data, and further adjusting the point cloud data sets based on the pre-defined tunnel geometry. Other objects having well-defined geodetic locations in locations other than the tunnel being traversed (such as an adjoining tunnel) may be detected and used to further adjust the point cloud data sets based on the other objects. The precise measurements of 3D rail coordinates may be taken from a trolley that rides along the rails, separately from the vehicle. The process may further include obtaining static LiDAR data from a static scanner, and further adjusting the point cloud data sets based on the static LiDAR data.

These and other objects and aspects of the present invention will be described with reference to the following drawings and detailed description.

BRIEF DESCRIPTION OF THE DRAWINGS

FIG. 2 is a diagram illustrating the location of a Hi-Rail vehicle, having the LiDAR, GPS and INS units, relative to a stationary GPS base station at the entrance of a rail tunnel to be investigated;

FIG. 3 is an illustration of an exemplary image identifiable target that can be located along the path of interest at known geospatial location;

DETAILED DESCRIPTION OF THE INVENTION

The present invention will be described using an example of collecting geospatially accurate and spatially representative information within a rail or subway tunnel. It will be appreciated, however, that the present invention will be applicable to numerous other projects to gather such information where GPS signals are not available or reliable.

Figure 1:
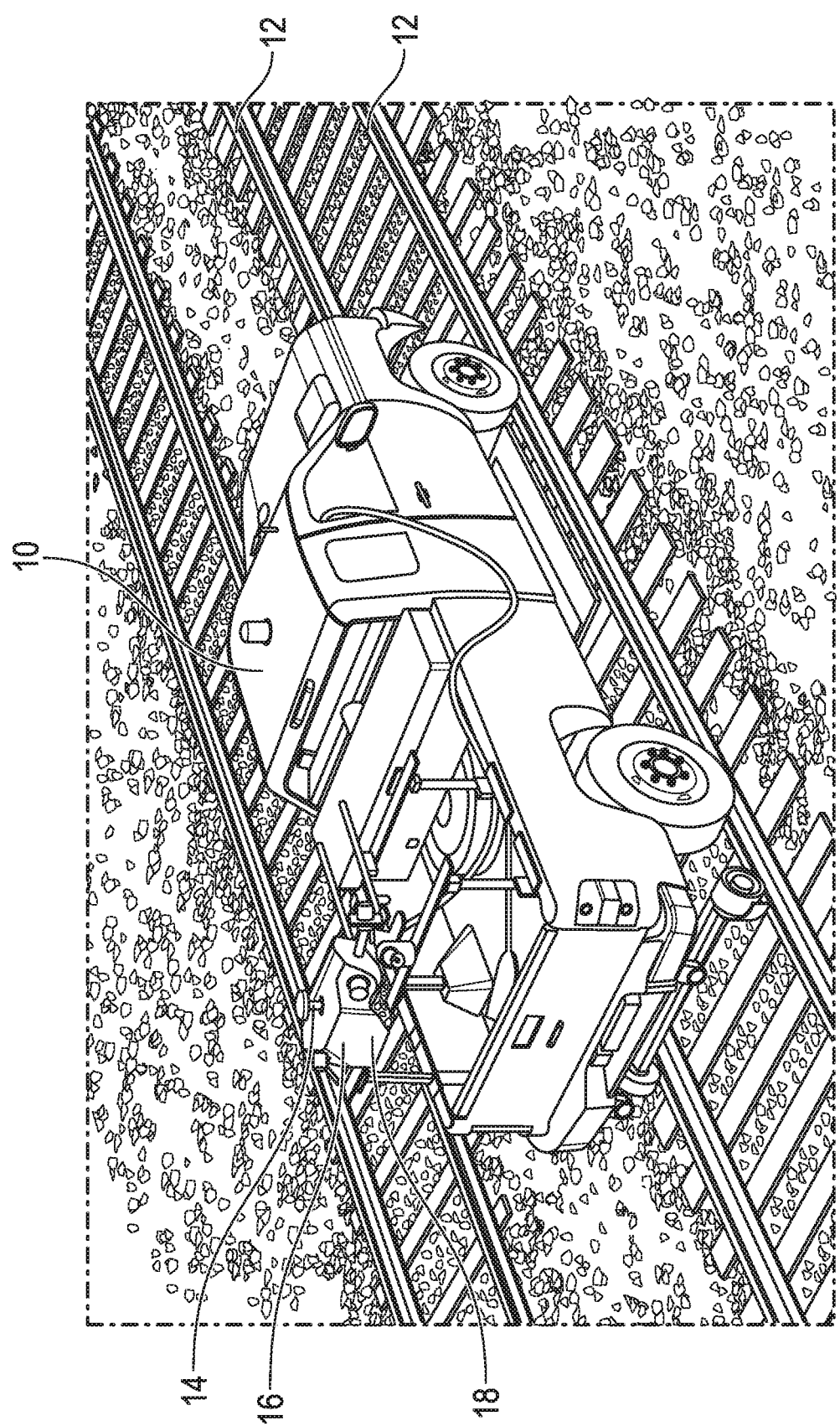
FIG. 1 is a photograph of a Hi-Rail vehicle, upon which is mounted a LiDAR unit, a GPS unit and an INS unit.

With reference to FIG. 1, a Hi-Rail vehicle 10 is placed on tracks 12. The Hi-Rail vehicle can operate both on rail tracks and a conventional road. When placed on the tracks, it can travel the path of interest. A LiDAR unit 14 is mounted on the vehicle at a precise position relative to the tracks 12. A GPS mobile unit 16 and an inertial navigation system (INS) 18 are also located on the vehicle at precise locations relative to the LiDAR unit. In operation, the Hi-Rail vehicle is driven along the path of interest to thereby produce mass point cloud datasets characterizing the scanned environment that can be managed, visualized and analyzed, as will be described.

The LiDAR unit 14 can be the system produced by Riegl Laser Measurement Systems under the name "VMX Compact Mobile LiDAR" system, or similar system, preferably set at a pulse rate of 550 KHz (eye safe non-visible laser data at 550,000 laser pulses per second per sensor), although alternative LiDAR units and pulse rates may be used, as will be appreciated. The GPS mobile unit 16 can be a well-known, standard unit capable of capturing positional information at 1 second epoch or the like. The INS 18 uses sophisticated gyroscope and accelerometer measurements to detect three-dimensional vehicle movement and orientation in a well-known manner, and can provide positional updates at a rate of 200 times per second, for example. A wheel mounted instrument (10a, FIG. 2), sometimes referred to as a distance measuring instrument, or "DMI", is used to measure vehicle speed.

With reference to FIG. 2, Hi-Rail vehicle 10 is initially positioned in an open-sky or otherwise favorable GPS environment, preferably adjacent to the entrance of a tunnel 20 to be studied. Examples of tunnels 20 may vary in length, having both inbound and outbound tracks. A stationary GPS base unit 22 may be positioned close to the tunnel entrance at a precisely known geodetic position which may be determined in a well-known manner using an OPUS solution, and the mobile GPS 16 may be calibrated therefrom, before entering the tunnel.

The Hi-Rail vehicle 10, with the LiDAR, GPS and INS and speed sensor, may be driven through the tunnel, and data captured, four times, for example, twice in each direction, at an approximate speed of 5-15 mph, or the like. Another stationary GPS can be located at the tunnel exit, or at any point along the path of the vehicle where GPS signals can be received, to provide positional correction data.

As the vehicle traverses the tunnel a plurality of times, the LiDAR, together with the GPS, INS and velocity data, provide mass point cloud datasets characterizing the scanned environment that can be managed, visualized and analyzed. However, because GPS information is not available during the time the vehicle is underground, such information is subject to positional translation or drift relative to fixed earth coordinates. Such errors can be somewhat reduced through the use of image-identifiable targets which may be mounted in the tunnel prior to the LiDAR measurements. The image-identifiable targets may be simple 1-foot square two-dimensional targets of an alternating white/black color scheme, an example of which is shown as 24 in FIG. 3. The targets may be affixed to wall sections or cross ties throughout the tunnel at appropriate intervals; this interval will vary from 250'-800' depending on geometry and data end usage. Prior to data processing, the locations of such targets can be accurately surveyed with conventional survey equipment, and their positions can be detected by the LiDAR unit and used as correction factors to the datasets to correct for drift. The data may also be reviewed against the mathematised geometry and additional corrections may be made.

Figure 4:
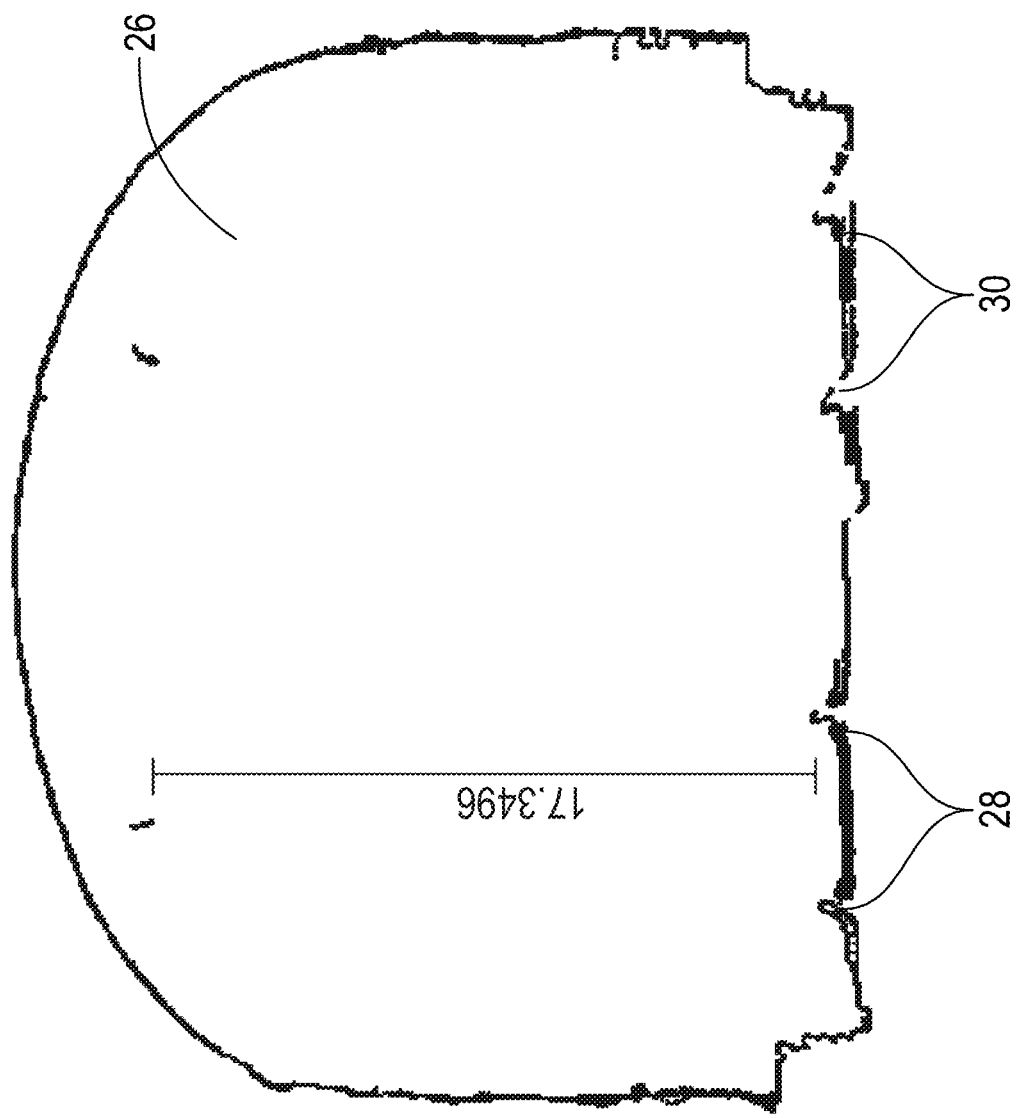
FIG. 4 is an illustration of a cross section of the configuration of a railroad tunnel based on LiDAR information.

Even with such corrections, however, critical positional information within the tunnel may be inaccurate or misleading, if for example, such targets are spaced far apart, in which case significant geophysical drift may occur between targets. Furthermore, the datasets may be lacking in important details. For example, FIG. 4 represents a cross section of a railroad tunnel 26. Although the cross-section reveals precise features of the tunnel, such as rails 28 and 30, the precise physical location of the rail features (such as horizontal and vertical positions and alignments) may not be accurately located relative to fixed geophysical coordinates.

Figure 5:
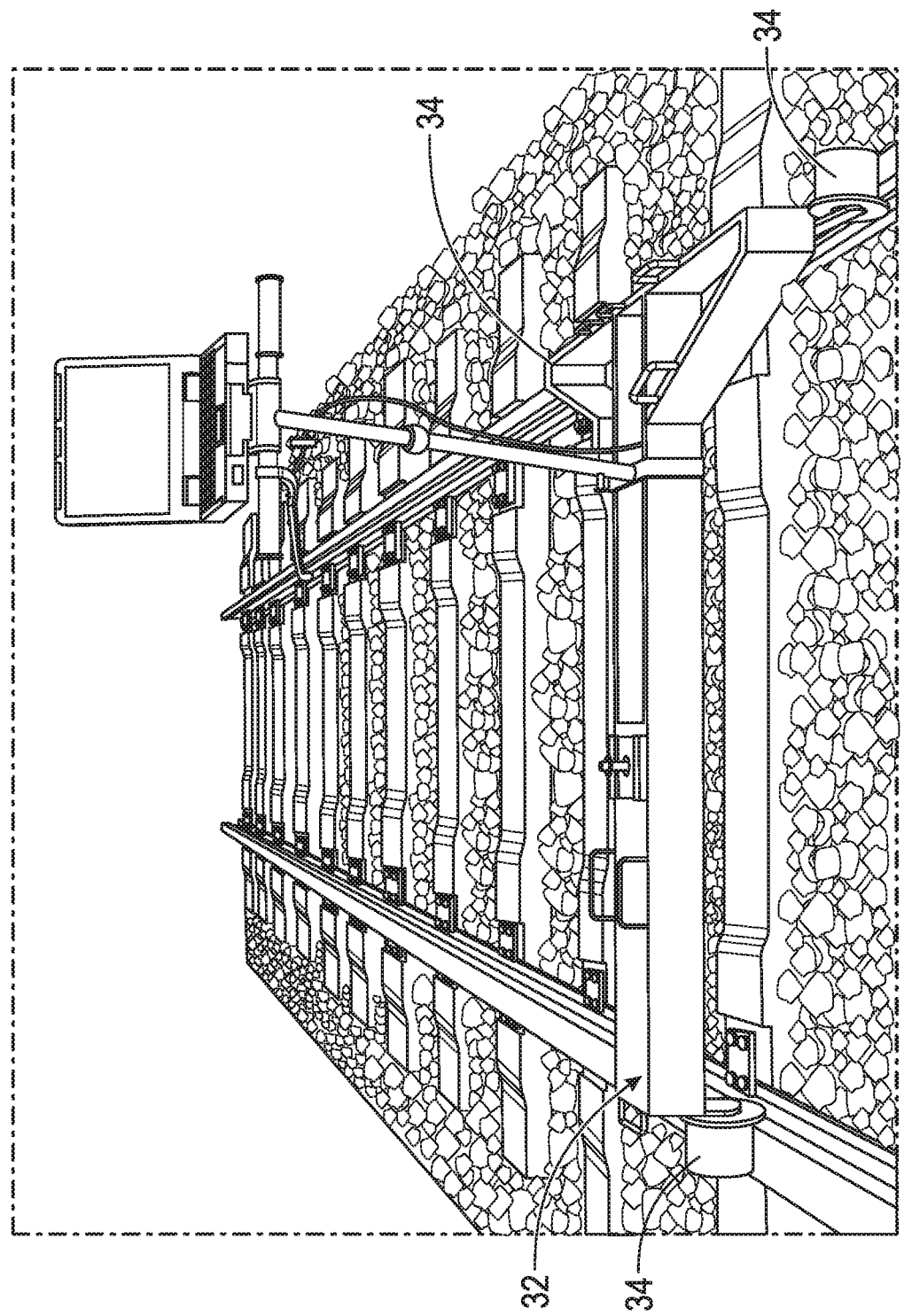
FIG. 5 is an illustration of an Amberg GRP Trolley.

Thus, in accordance with the present invention, additional, "ancillary" corrections are developed and used to yield highly accurate 3D geophysical positional information for fine detail features of the tunnel pathway. One such ancillary correction can be achieved through the use of an "Amberg GRP Trolley," available from Amberg Technologies, an example of which is illustrated in FIG. 5. The trolley 32 rolls on rollers 34, 36 and 38 along the rails of the track under study, and as the trolley traverses the track, its position is tracked by a conventional robotic total station survey instrument which is set on a known geophysical position. The trolley is outfitted with high precision sensors for measurement of rail characteristics such as gauge, superelevation (cant), stationing (chainage), track center, and can determine precise 3D track coordinates.

Another ancillary correction can be made through the use of known tunnel geometry whenever such information is available. For example, a tunnel may have been built with specific features at precise geophysical locations along its length, and in such cases, this information can be used to correct positional information.

Figure 5A:
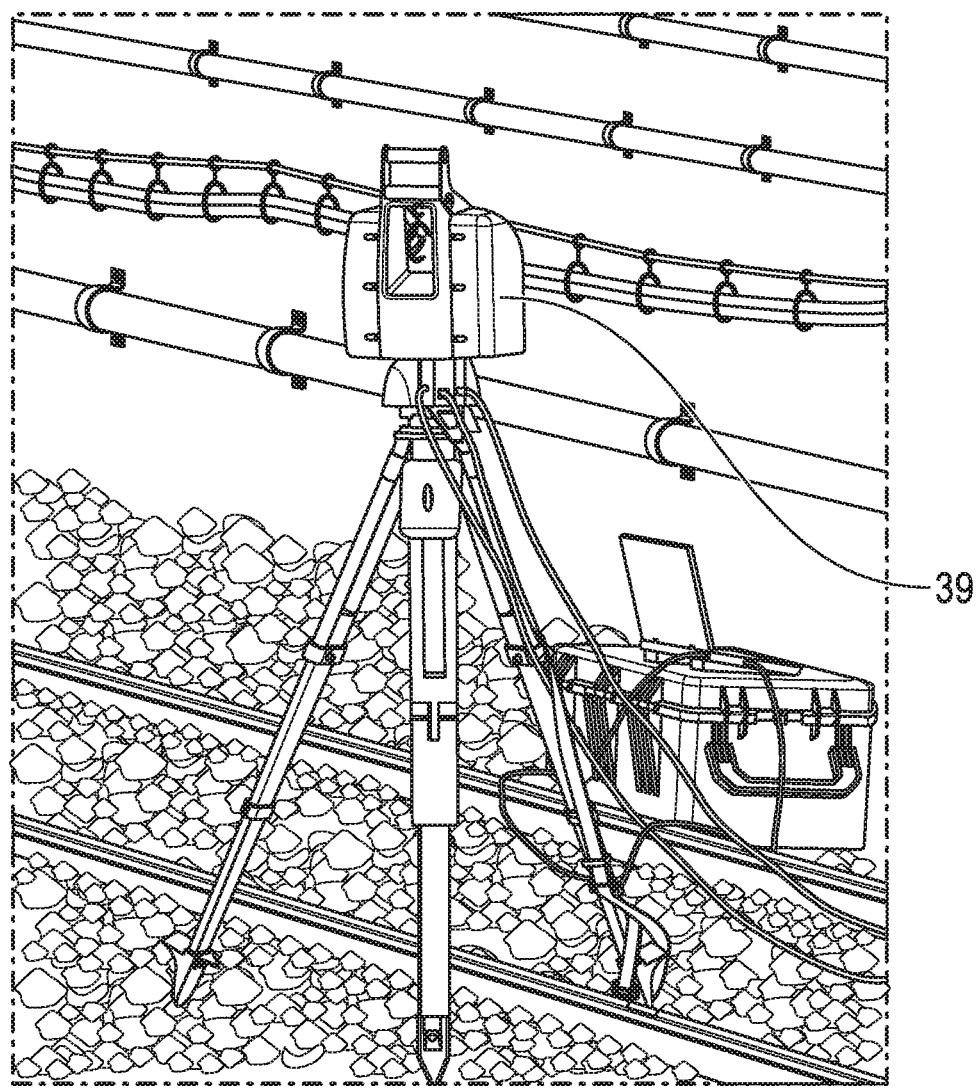
FIG. 5a is a photograph of a static LiDAR scanner.

Yet another ancillary correction can be made through the use of a "static" scanner. As shown in FIG. 5a, the static scanner 39 is a LiDAR sensor mounted on a tripod and set on a known geophysical position. It creates 3D point cloud data which can be used to correct positional information.

Finally, another ancillary correction can be made by recognizing known features that might be available outside the track under study. For example, as the Hi-Rail traverses the track under study, it may be able to "see" a feature in an adjoining track whose precise geophysical position is known. In such circumstances, that information can be used as a further correction.

Figure 6:
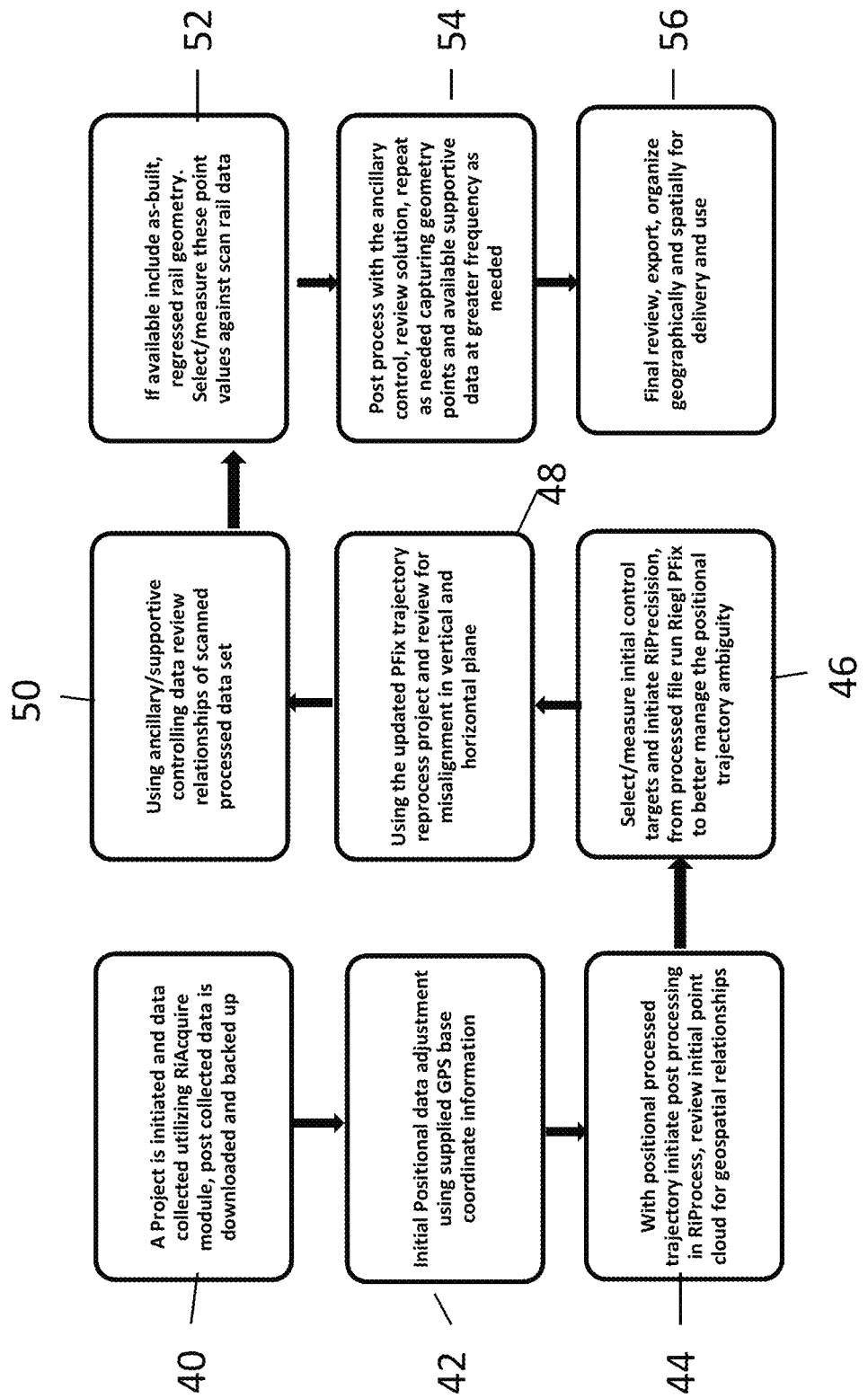
FIG. 6 is a flow chart illustrating the process for using standard and ancillary corrections to LiDAR data to yield a highly accurate 3D geophysical positional information for fine detail features of a pathway of interest.

The manner in which the foregoing corrections can be made will be discussed with reference to FIG. 6, which represents the process flow for developing detailed, precise and accurate information through the use of such correction factors. In particular, the process flow as described is adapted to the following processing software provided by the manufacturer of the LiDAR unit referenced above, Riegl Laser Measurement Systems. In particular, an acquisition software module called RiACQUIRE, an initial processing software module called RiPROCESS, a final adjusting module called RiPRECISSION and imbedded trajectory analysis such as PFIX, can be used as will readily be understood by those skilled in the art based on the following description of FIG. 6 and the Riegl software description and user instructions for these modules. The entire contents of the Riegl software description and user instructions for these modules, including the "Data Sheet, RiACQUIRE, 2016 Sep. 19", the "Data Sheet, RiPROCESS, 2016 Sep. 16" and the "Brochure, RiPRECISION MLS, 2017 Sep. 1" are hereby incorporated by reference. It will be appreciated, however, that similar processing capabilities may be provided by other sources, such as other LiDAR system manufacturers.

In block 40, project data, such as track identification, date, etc., is collected using RiACQUIRE, downloaded and backed up. In block 42, initial positional data adjustment of the mobile GPS is performed using the supplied GPS base coordinate information, as generally indicated in FIG. 2. Thereafter, the Hi-Rail vehicle proceeds to traverse the path of interest and in block 44, post processing is initiated to review the initial point cloud for geospatial relationships. In block 46, initial control targets, such as the targets 24, FIG. 3, and any other known targets from adjoining tracks, for example, are selected and their relative positions in the point cloud are measured. That information is applied to the RiPRECISION program, to produce updated and corrected measurements, called "PFIX" in RiPRECISION, to better manage the positional trajectory ambiguity.

Using the updated PFIX trajectory, the project is reprocessed in block 48, and reviewed for misalignment in the vertical and horizontal planes. Then, in block 50, ancillary/supportive controlling data, such as the precise rail data provided by the Amberg trolley, are used to review the relationships of the scanned processed data set. If additional known tunnel geometry is available, selected point values are measured in block 52, and the scanned rail data can be updated. In block 54, the geometries can be post-processed with the ancillary control data, the solution can be reviewed, and the process repeated, capturing geometry points and available supportive data at greater frequencies, as needed. In block 56, a final review can be conducted, the results exported and organized geographically and spatially for delivery and use.

It will be appreciated that the foregoing preferred embodiments described herein are set forth as exemplary, and it will be appreciated that various modifications may be made without departing from the scope and spirit of the invention which is defined by the following claims.

We claim:

1. A process for constructing highly accurate three-dimensional mappings of objects along a tunnel in which, at least in portions of said tunnel GPS signal information is not available, said tunnel having rails for accommodating railroad or subway cars, or the like, comprising:
 a. providing a vehicle for traversing said tunnel on said rails;
 b. locating on said vehicle
  i. a LiDAR unit,
  ii. a mobile GPS unit,
  iii. an inertial navigation system, and
  iv. a speed sensor to determine the speed of said vehicle,
 c. locating near the entrance of said tunnel a stationary GPS, whose geolocation is well-defined;
 d. locating image-identifiable targets at preselected locations within said tunnel, said targets having well-defined geodetic locations;
 e. adjusting said mobile GPS unit based on said geolocation of said stationary GPS;
 f. traversing said tunnel with said vehicle, said LiDAR thereby producing mass point cloud datasets along said tunnel;
 g. obtaining precise measurements of 3D rail coordinates, including at least one of superelevation and track center; and
 h. adjusting said point cloud datasets based on said mobile GPS unit, said inertial navigation system, said speed sensor, said location of said image-identifiable targets, and said precise measurements of 3D rail coordinates, to thereby produce highly accurate, and substantially geodetically correct, three-dimensional mappings of objects along said tunnel.

2. The process of claim 1, further including obtaining pre-defined tunnel geometry data, and further adjusting said point cloud data sets based on said pre-defined tunnel geometry.

3. The process of claim 1 further including the identification of other objects having well-defined geodetic locations in locations other than the tunnel being traversed, and further adjusting said point cloud data sets based on said other objects.

4. The process of claim 3 wherein said other objects are in tunnels adjoining the tunnel said vehicle is traversing.

5. The process of claim 1 wherein said precise measurements of 3D rail coordinates are taken from a trolley that rides along said rails, separately from said vehicle.

6. The process of claim 1, further including obtaining static data from a static scanner, and further adjusting said point cloud data sets based on said static data.

\* \* \* \* \*